United States Patent
Mizoguchi et al.

(10) Patent No.: US 9,262,994 B2
(45) Date of Patent: Feb. 16, 2016

(54) INFORMATION TERMINAL, MOBILE INFORMATION TERMINAL, AND VIDEO IMAGE DISPLAY SYSTEM

(71) Applicant: Seiko Epson Corporation, Tokyo (JP)

(72) Inventors: Yasushi Mizoguchi, Suwa (JP); Shuichi Wakabayashi, Okaya (JP); Daisuke Uchikawa, Shiojiri (JP)

(73) Assignee: Seiko Epson Corporation (JP)

( * ) Notice: Subject to any disclaimer, the term of this patent is extended or adjusted under 35 U.S.C. 154(b) by 277 days.

(21) Appl. No.: 13/964,222

(22) Filed: Aug. 12, 2013

(65) Prior Publication Data
US 2014/0049569 A1  Feb. 20, 2014

(30) Foreign Application Priority Data

Aug. 17, 2012 (JP) ................... 2012-180907

(51) Int. Cl.
| | |
|---|---|
| G09G 5/10 | (2006.01) |
| G06F 3/147 | (2006.01) |
| H04N 1/00 | (2006.01) |
| G02B 27/01 | (2006.01) |
| H04N 9/31 | (2006.01) |

(52) U.S. Cl.
CPC ............ *G09G 5/10* (2013.01); *G02B 27/017* (2013.01); *G06F 3/147* (2013.01); *H04N 1/00* (2013.01); *H04N 9/3135* (2013.01); *H04N 9/3173* (2013.01)

(58) Field of Classification Search
None
See application file for complete search history.

(56) References Cited

U.S. PATENT DOCUMENTS

| | | | |
|---|---|---|---|
| 7,235,778 B2 | 6/2007 | Asai | |
| 7,830,357 B2 | 11/2010 | Kitaoka | |
| 2010/0210312 A1* | 8/2010 | Kim et al. | 455/566 |
| 2011/0205456 A1* | 8/2011 | Mizoguchi et al. | 349/5 |
| 2013/0070209 A1* | 3/2013 | Cantelobre | 353/37 |

FOREIGN PATENT DOCUMENTS

| | | |
|---|---|---|
| JP | 2005-107070 | 4/2005 |
| JP | 4023426 | 10/2007 |
| WO | 2006-011515 | 2/2006 |

* cited by examiner

*Primary Examiner* — Seokyun Moon
(74) *Attorney, Agent, or Firm* — Harness, Dickey & Pierce, P.L.C.

(57) ABSTRACT

An information terminal includes: a display section that displays an image; a light source that emits light; an optical signal generator that uses the light emitted from the light source to generate an optical signal with which an optical scanner scans an object; a drive signal generator that generates a drive signal for driving the optical scanner; and a switcher that switches the state of the information terminal between a first state in which the display section displays an image, the optical signal generator does not generate the optical signal, and the drive signal generator does not generate the drive signal and a second state in which the optical signal generator generates the optical signal, the drive signal generator generates the drive signal, and the display section displays no image.

18 Claims, 9 Drawing Sheets

INFORMATION TERMINAL, MOBILE INFORMATION TERMINAL, AND VIDEO IMAGE DISPLAY SYSTEM

BACKGROUND

1. Technical Field

The present invention relates to an information terminal, a mobile information terminal, and a video image display system.

2. Related Art

As an image display apparatus, there is a known head mounted display that is worn around the head of a viewer for use and displays a virtual image as an image visually recognized by the viewer (see JP-A-2005-107070, for example).

For example, the image display apparatus described in JP-A-2005-107070 includes a light source, two optical scanners that scan an object two-dimensionally with light from the light source, and a light source drive circuit that drives the light source. The image display apparatus receives image information as an input from an external apparatus connected to the image display apparatus in order to display an image.

In a case where a mobile information terminal is used as the external apparatus connected to an image display apparatus of the type described above, some mobile information terminals of related art have a function of inputting image information to the image display apparatus but cannot output an optical signal with which the optical scanners scan an object. It is therefore necessary to provide the image display apparatus with a light source for image display in related art as described above.

The thus configured image display apparatus, which is provided with not only the optical scanners but also the light source for image display, has a problem of an increase in size and weight of the image display apparatus.

SUMMARY

An advantage of some aspects of the invention is to not only provide an information terminal and a mobile information terminal that can be connected to an image display apparatus having no light source for image display and allow the image display apparatus to display an image but also provide a video image display system including the information terminal and the image display apparatus having a reduced size and weight.

An aspect of the invention is directed to an information terminal including a display section that displays an image, a light source that emits light, an optical signal generator that uses the light emitted from the light source to generate an optical signal with which an optical scanner scans an object, a drive signal generator that generates a drive signal for driving the optical scanner, and a switcher that switches the state of the information terminal between a first state in which the display section displays an image, the optical signal generator does not generate the optical signal, and the drive signal generator does not generate the drive signal and a second state in which the optical signal generator generates the optical signal, the drive signal generator generates the drive signal, and the display section displays no image.

The thus configured information terminal can not only display an image in the display section but also display the image in an image display apparatus having no light source for image display.

Further, the information terminal can generate an optical signal with which the optical scanner scans an object and a drive signal for driving the optical scanner, the image display apparatus to be used does not need a light source, a drive circuit for the light source, or a drive circuit for the optical scanner.

In the information terminal according to the aspect of the invention, it is preferable that the display section includes a spatial light modulator, and that the switcher performs optical path switching in such a way that the spatial light modulator is irradiated with the light emitted from the light source in the first state, whereas the spatial light modulator is not irradiated with the light from the light source in the second state.

Since no light source that emits illumination light for the display section therefore needs to be provided separately from the light source that forms an optical signal for the optical scanner, the size and weight of the information terminal can be reduced.

In the information terminal according to the aspect of the invention, it is preferable that the terminal further includes an optical signal output portion that outputs the optical signal out of the information terminal, a drive signal output portion that outputs the drive signal out of the information terminal, and a connection section to and from which a connector provided on a cable including an optical fiber and a signal line is connectable and disconnectable, and it is preferable that when the connector is connected to the connection section, the optical signal output portion is optically connected to the optical fiber and the drive signal output portion is electrically connected to the signal line.

The connection section allows the optical signal output portion to be optically connected to an image display apparatus including the optical scanner and the drive signal output portion to be electrically connected to the image display apparatus only when the connection is required.

In the information terminal according to the aspect of the invention, it is preferable that the terminal further includes a connection detection portion that detects whether or not the connector is connected to the connection section, and the switcher sets the state of the information terminal based on a detection result from the connection detection portion to be the first state when the connector is not connected to the connection section whereas setting the state to be the second state when the connector is connected to the connection section.

The first state and the second state can therefore be switched from each other in accordance with connection or disconnection of the connector to or from the connection section.

In the information terminal according to the aspect of the invention, it is preferable that the light source is formed of a plurality of light sources that produce light fluxes having wavelengths different from each other.

The thus configured information terminal allows an image display apparatus to display a multicolored image.

In the information terminal according to the aspect of the invention, it is preferable that the optical signal generator includes a light combiner that combines the light fluxes from the plurality of light sources with each other.

In the thus configured information terminal, the number of optical fibers each transmitting an optical signal to the image display apparatus can be reduced.

In the information terminal according to the aspect of the invention, it is preferable that the drive signal generator includes a first drive circuit that generates a first drive signal used by the optical scanner to perform scanning in a first direction and a second drive circuit that generates a second drive signal used by the optical scanner to perform scanning in a second direction perpendicular to the first direction.

The thus configured drive signal generator allows an image display apparatus to display an image by using the optical scanner while eliminating a need to provide the image display apparatus with a built-in power source for driving the optical scanner.

In the information terminal according to the aspect of the invention, it is preferable that the drive signal generator includes a signal superimposing portion that superimposes the first drive signal and the second drive signal on each other.

In the thus configured information terminal, the number of signal lines each transmitting a drive signal to the image display apparatus can be reduced.

Another aspect of the invention is directed to a mobile information terminal including a display section that displays an image, a light source that emits light, an optical signal generator that uses the light emitted from the light source to generate an optical signal with which an optical scanner scans an object, a drive signal generator that generates a drive signal for driving the optical scanner, and a switcher that switches the state of the mobile information terminal between a first state in which the display section displays an image, the optical signal generator does not generate the optical signal, and the drive signal generator does not generate the drive signal and a second state in which the optical signal generator generates the optical signal, the drive signal generator generates the drive signal, and the display section displays no image.

The thus configured mobile information terminal can display an image in an image display apparatus having no light source for image display.

Still another aspect of the invention is directed to a video image display system including the information terminal according to the aspect of the invention, and an image display apparatus including the optical scanner and connected to the information terminal.

In the thus configured video image display system, the size and weight of the image display apparatus can be reduced.

In the video image display system according to the aspect of the invention, it is preferable that the optical scanner includes a movable portion that is provided with a light reflection portion that reflects light and swingable around a first axis, a frame that is swingable around a second axis that intersects the first axis, a first shaft that has one end connected to the movable portion and the other end connected to the frame and supports the movable portion in such a way that the movable portion is swingable around the first axis, and a second shaft that has one end connected to the frame and supports the frame in such a way that the frame is swingable around the second axis.

The thus configured optical scanner has a reduced size.

In the video image display system according to the aspect of the invention, it is preferable that the optical scanner further includes a permanent magnet and a coil, the permanent magnet and the coil are so disposed that one of the permanent magnet and the coil is disposed on the frame and the other one of the permanent magnet and the coil is disposed in a position facing the frame, the drive signal generator includes a first drive circuit that generates a first drive signal that causes the movable portion to swing around the first axis and a second drive circuit that generates a second drive signal that causes the movable portion to swing around the second axis perpendicular to the first axis, and the first drive signal and the second drive signal are superimposed on each other and the superimposed drive signal is applied to the coil.

The thus configured optical scanner has a reduced size.

In the video image display system according to the aspect of the invention, it is preferable that the image display apparatus is a head mounted display.

A user who wears the thus configured head mounted display has a reduced degree of fatigue, and the head mounted display also provides a high degree of freedom in exterior appearance.

BRIEF DESCRIPTION OF THE DRAWINGS

The invention will be described with reference to the accompanying drawings, wherein like numbers reference like elements.

DESCRIPTION OF EXEMPLARY EMBODIMENTS

An information terminal, a mobile information terminal, and a video image display system according to preferable embodiments of the invention will be described below with reference to the accompanying drawings.

First Embodiment

Figure 1:
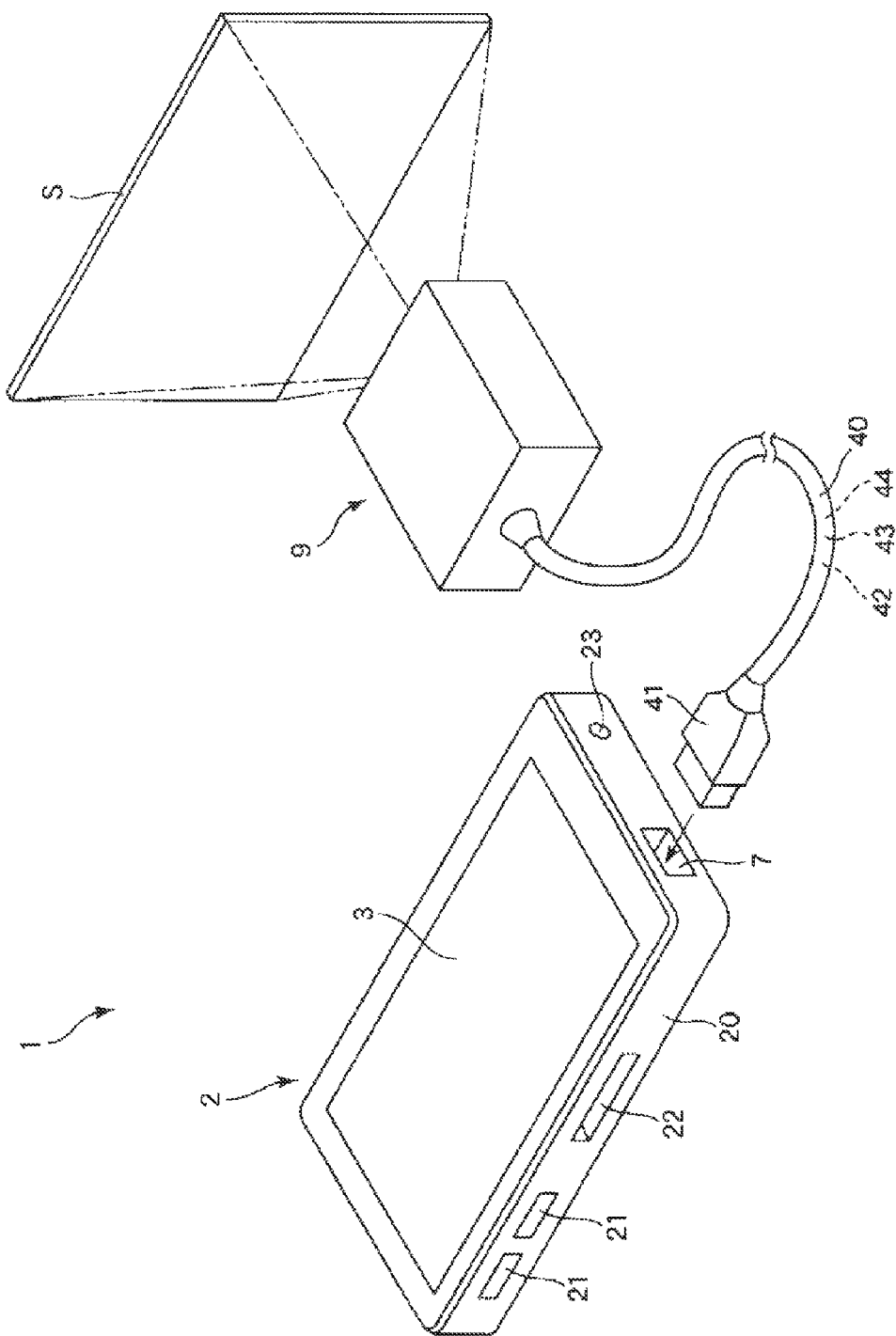
FIG. 1 shows a schematic configuration of a video image display system according to a first embodiment of the invention.
Figure 2:
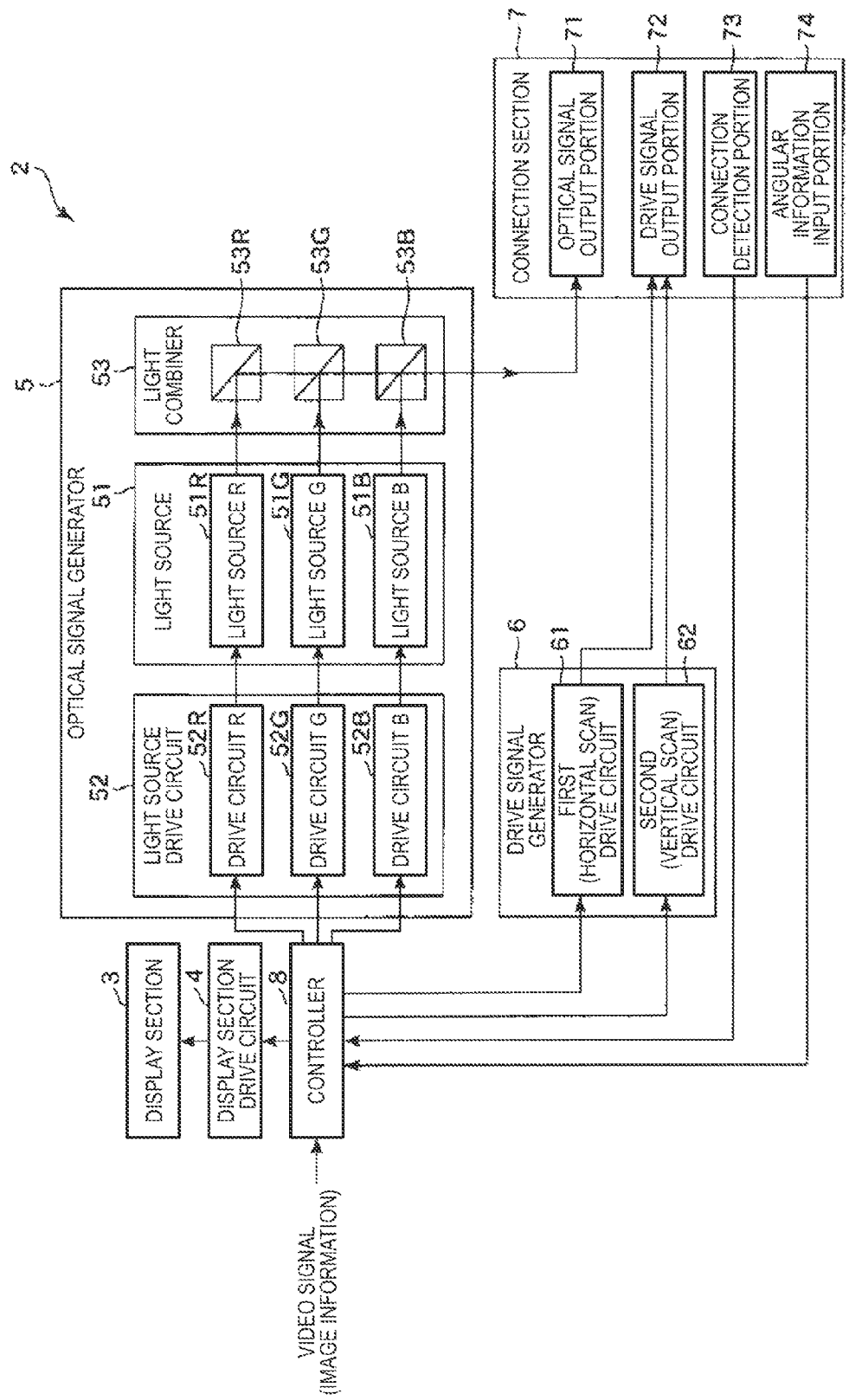
FIG. 2 is a block diagram showing a schematic configuration of an information terminal (mobile information terminal) in the video image display system shown in FIG. 1.
Figure 3A:
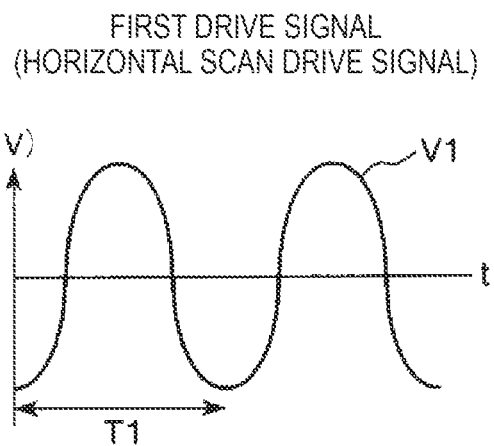
FIGS. 3A and 3B each show an example of a drive signal generated by a drive signal generator shown in FIG. 2.
Figure 3B:
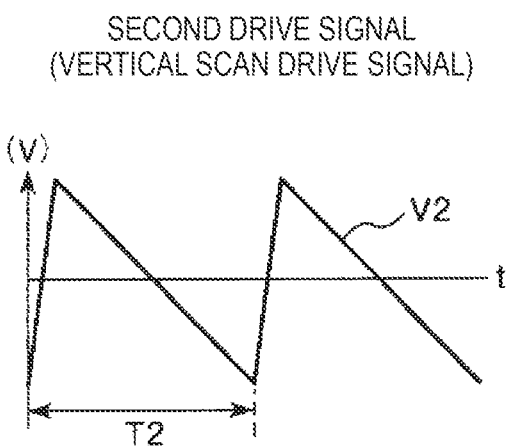
Figure 4:
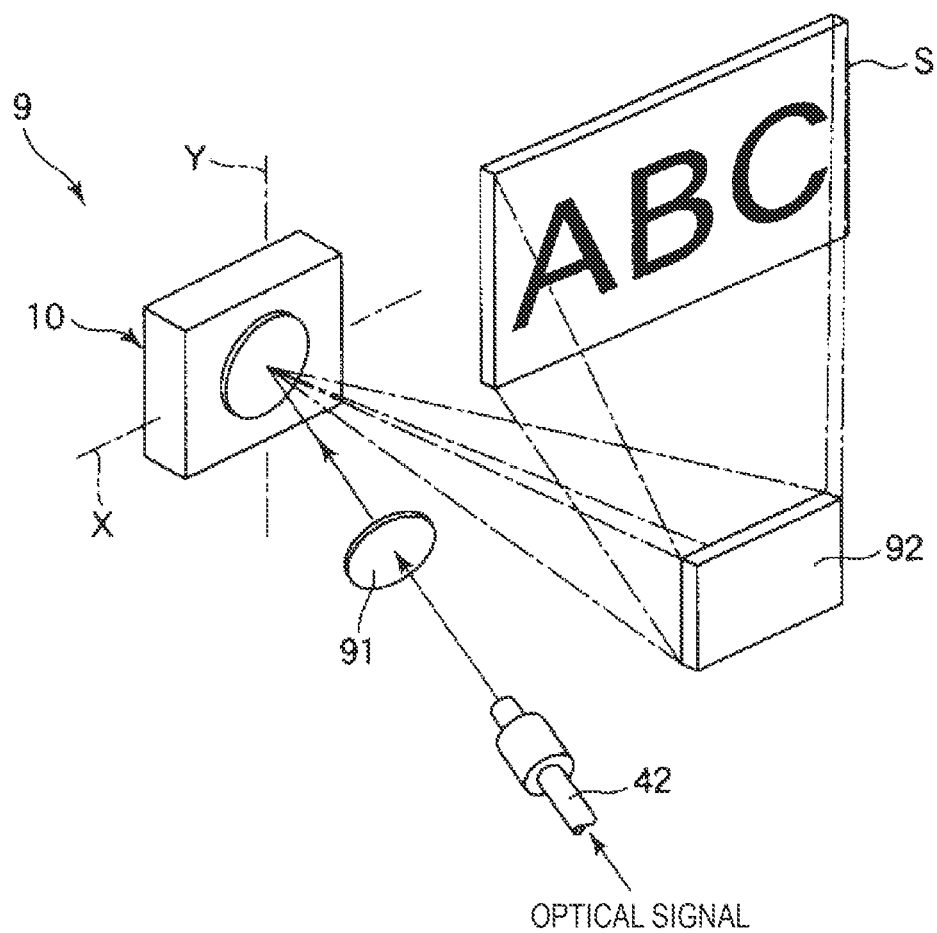
FIG. 4 shows a schematic configuration of an image display apparatus in the video image display system shown in FIG. 1.
Figure 5:
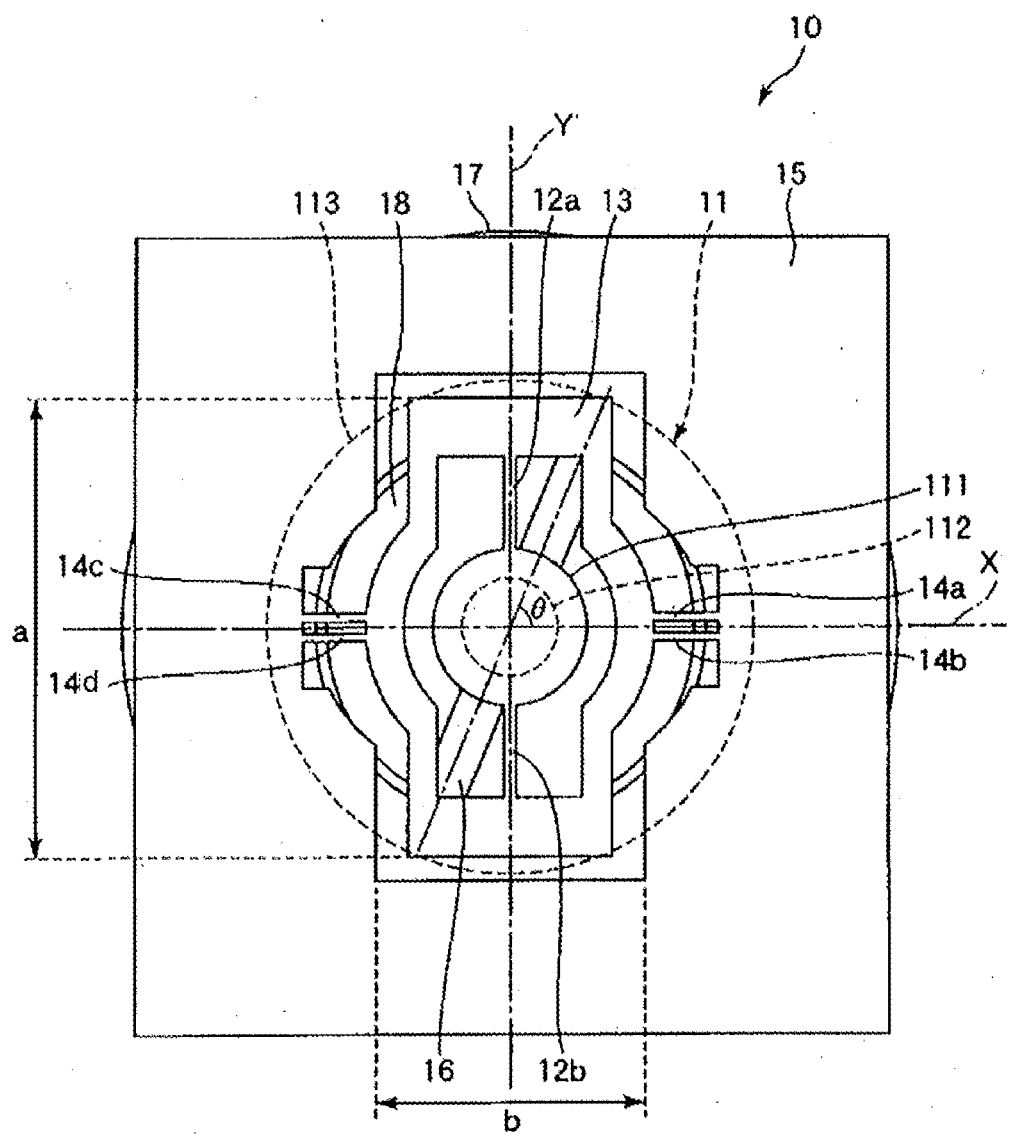
FIG. 5 is a plan view of an optical scanner shown in FIG. 4.
Figure 6:
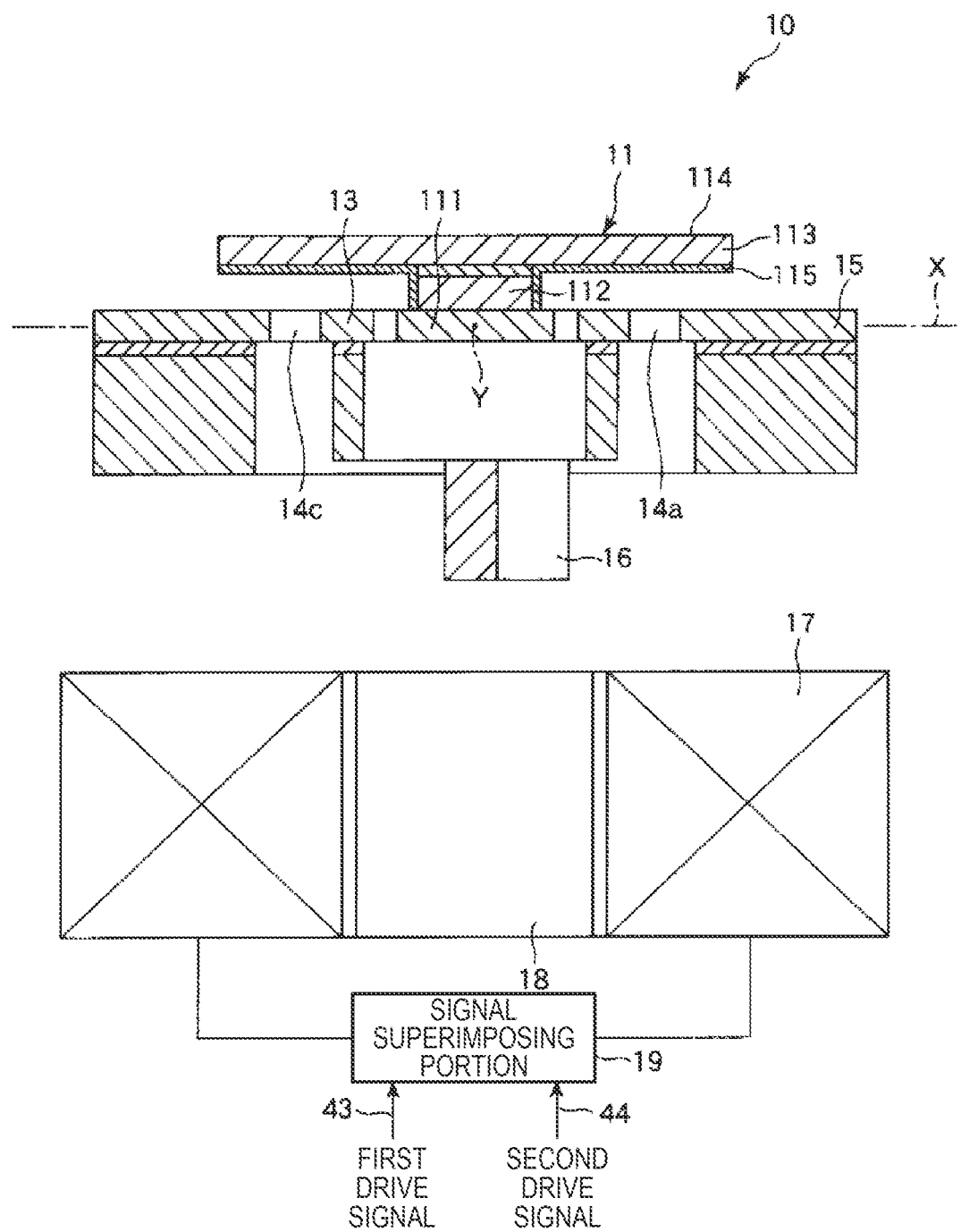
FIG. 6 is a cross-sectional view (cross-sectional view taken along X axis) of the optical scanner shown in FIG. 5.

FIG. 1 shows a schematic configuration of a video image display system according to a first embodiment of the invention. FIG. 2 is a block diagram showing a schematic configuration of an information terminal (mobile information terminal) in the video image display system shown in FIG. 1. FIGS. 3A and 3B each show an example of a drive signal generated by a drive signal generator shown in FIG. 2. FIG. 4 shows a schematic configuration of an image display apparatus in the video image display system shown in FIG. 1. FIG. 5 is a plan view of an optical scanner shown in FIG. 4. FIG. 6 is a cross-sectional view (cross-sectional view taken along X axis) of the optical scanner shown in FIG. 5.

The video image display system 1 includes an information terminal 2, which displays an image in a display section 3, and an image display apparatus 9, which displays the image on a screen S, as shown in FIG. 1.

In the video image display system 1, the information terminal 2, when used on a standalone basis, displays an image in the display section 3, whereas the information terminal 2, when connected to the image display apparatus 9 via a cable 40, causes the image display apparatus 9 to display the image on the screen S by using an optical signal and a drive signal from the information terminal 2.

The components in the video image display system 1 will be sequentially described below in detail.

Information Terminal

The information terminal 2 is, for example, a mobile phone, a portable navigation device, or any other mobile information terminal. The information terminal 2, although not described in detail, has not only an image display function, which will be described later, but also a conversation function, a GPS reception function, a music reproduction function, and other functions. The functions other than the image display function may be provided as required or may be omitted.

The information terminal 2 has an enclosure 20 (casing) dimensioned to be suitably grasped by a hand and provided with control buttons 21, a card slot 22, and an audio port 23, as shown in FIG. 1.

The information terminal 2 further includes the display section 3, a display section drive circuit 4, an optical signal generator 5, a drive signal generator 6, and a connection section 7, as shown in FIG. 2.

The display section 3 is provided in the enclosure 20.

The display section 3 displays an image in accordance with image information. The display section 3 is not limited to a specific one and can use a known display panel, for example, a liquid crystal panel, an organic EL panel, and a plasma display.

Further, in the present embodiment, when the display panel is formed of a display device including a spatial light modulator illuminated with light, such as a liquid crystal panel, the display section 3 includes a light source for illuminating the spatial light modulator and a light guide plate that irradiates the spatial light modulator with light from the light source as the illumination light.

The thus configured display section 3 is electrically connected to the display section drive circuit 4.

The display section drive circuit 4 has a function of driving the display section 3. The display section drive circuit 4 is not limited to a specific one and can, for example, be a drive circuit that drives the display panel described above, more specifically, for example, a passive-matrix drive circuit or an active-matrix drive circuit.

The optical signal generator 5 generates an optical signal with which an optical scanner 10, which will be described later, scans (optically scans) the screen S. The optical signal is an optical pulse signal modulated in accordance with a video signal and the on-screen position of the light with which the optical scanner 10 scans the screen S.

The optical signal generator 5 includes a light source 51, a light source drive circuit 52, and a light combiner 53.

The light source 51 is formed of a plurality of light sources 51R, 51G, and 51B, which produce light fluxes having wavelengths different from each other.

The light source 51R (light source R) emits red light. The light source 51G (light source G) emits green light. The light source 51B (light source B) emits blue light. Using the three color light fluxes allows the image display apparatus 9 to display a full-color image.

Each of the light sources 51R, 51G, and 51B is not limited to a specific one and can, for example, be a laser diode.

Each of the light sources 51R, 51G, and 51B is electrically connected to the light source drive circuit 52.

The light source drive circuit 52 is formed of a plurality of drive circuits 52R, 52G, and 52B.

The drive circuit 52R has a function of driving the light source 51R described above. The drive circuit 52G has a function of driving the light source 51G described above. The drive circuit 52B has a function of driving the light source 51B described above.

The three (color) light fluxes emitted from the light sources 51R, 51G, and 51B driven by the drive circuits 52R, 52G, and 52B respectively are incident on the light combiner 53.

The light combiner 53 combines the light fluxes from the plurality of light sources 51R, 51G, and 51B, whereby the number of optical fibers that each transmit an optical signal generated by the optical signal generator 5 to the image display apparatus 9 can be reduced. In the present embodiment, the optical signal can therefore be transmitted from the information terminal 2 to the image display apparatus 9 through a single optical fiber 42 in the cable 40.

In the present embodiment, the light combiner 53 includes a plurality of dichroic mirrors 53R, 53G, and 53B. In the present embodiment, the dichroic mirror 53R is presented by way of example of a component that deflects the light emitted from the light source 51R, and a reflection mirror made of a metal may alternatively be used. Further, when no light deflection is required, the light combiner 53 may not include the dichroic mirror 53R. Moreover, the light combiner 53 is not limited to the configuration described above and may, for example, be formed of an optical waveguide or an optical fiber (wavelength multiplexing coupler).

The drive signal generator 6 generates a drive signal that drives the optical scanner 10 in the image display apparatus 9, which will be described later.

The drive signal generator 6 includes a drive circuit 61 (first drive circuit), which generates a first drive signal used by the optical scanner 10 to perform scanning in a first direction (width direction of screen S) (horizontal scan), and a drive circuit 62 (second drive circuit), which generates a second drive signal used by the optical scanner 10 to perform scanning in a second direction perpendicular to the first direction (height direction of screen S) (vertical scan). The thus configured drive signal generator 6 allows the image display apparatus 9 to display an image by using the optical scanner 10 while eliminating a need to provide the image display apparatus 9 with a built-in power source.

For example, the drive circuit 61 generates a first drive signal V1 (voltage for horizontal scan), which periodically changes at a cycle T1 as shown in FIG. 3A, and the drive circuit 62 generates a second drive signal V2 (voltage for vertical scan), which periodically changes at a cycle T2 different from the cycle T1 as shown in FIG. 3B.

The first and second drive signals will be described later in detail.

The optical signal generated by the optical signal generator 5 described above and the drive signals (first and second drive signals) generated by the drive signal generator 6 are transmitted to the connection section 7.

The connection section 7 is a portion to and from which a connector 41 provided on the cable 40 can be attached and detached.

The cable 40 includes the optical fiber 42 and signal lines 43 and 44 (see FIG. 1). In the present embodiment, the signal line 43 transmits the first drive signal V1, and the signal line 44 transmits the second drive signal V2. The cable 40 further includes, although not shown, a signal line through which information on the angle of the optical scanner 10 in the image display apparatus 9, which will be described later, is inputted to the information terminal 2.

The connection section 7 further includes an optical signal output portion 71, a drive signal output portion 72, a connection detection portion 73, and an angular information input portion 74.

The optical signal output portion 71 outputs the optical signal generated by the optical signal generator 5 out of the information terminal 2. The drive signal output portion 72 outputs the drive signals (first and second drive signals) generated by the drive signal generator 6 out of the information terminal 2.

Providing the optical signal output portion 71 and the drive signal output portion 72 described above not only allows the display section 3 to display an image but also allows the image display apparatus 9, which includes the optical scanner 10, to display the image. The image display apparatus 9 can therefore display an image even when the image display apparatus 9 has no light source for image display.

The connection detection portion 73 detects whether or not the connector 41 is connected to the connection section 7.

The angular information input portion 74 inputs information representing the angle of the optical scanner 10 in the image display apparatus 9 and generated in the image display apparatus 9, which will be described later, to the information terminal 2.

When the connector 41 is connected to the connection section 7, the optical signal output portion 71 is optically connected to the optical fiber 42, and the drive signal output portion 72 is electrically connected to the signal lines 43 and 44.

The connection section 7 allows the optical signal output portion 71 to be optically connected to the image display apparatus 9, which includes the optical scanner 10, and the drive signal output portion 72 to be electrically connected to the image display apparatus 9 only when the connection is required.

The display section drive circuit 4, the light source drive circuit 52 in the optical signal generator 5, the drive circuits 61 and 62 in the drive signal generator 6, and the connection detection portion 73 and the angular information input portion 74 in the connection section 7 described above are electrically connected to a controller 8. That is, a signal representing connection or disconnection and detected by the connection detection portion 73 and the information representing the angle of the optical scanner 10 and inputted through the angular information input portion 74 to the information terminal 2 are transmitted to the controller 8.

The controller 8 has a function of controlling drive operation of each of the display section drive circuit 4, the light source drive circuit 52 in the optical signal generator 5, and the drive circuits 61 and 62 in the drive signal generator 6 based on a video signal (image signal).

The controller 8 further has a function of switching the state of the information terminal between a first state in which the display section 3 displays an image, the optical signal generator 5 generates no optical signal, and the drive signal generator 6 generates no drive signals (hereinafter also simply referred to as "first state") and a second state in which the optical signal generator 5 generates the optical signal, the drive signal generator 6 generates the drive signals, and the display section 3 displays no image (hereinafter also simply referred to as "second state"). That is, the controller 8 forms a switcher that switches the state of the information terminal between the first state and the second state. Providing the switcher prevents the display section 3 of the information terminal 2 from displaying an image when the image display apparatus 9 including the optical scanner 10 displays an image, whereby the information terminal 2 will not consume unnecessary electric power.

The controller 8 switches the state of the information terminal between the first state and the second state based on a detection result from the connection detection portion 73. The first state and the second state can therefore be switched from each other in accordance with connection or disconnection of the connector 41 to or from the connection section 7, whereby no separate operation of switching the state of the information terminal between the first state and the second state is required and convenience of a user of the information terminal can be enhanced.

Further, since connecting the connector 41 to the connection section 7 allows the controller 8 to obtain the information on the angle of the optical scanner 10 in the image display apparatus 9, the drive signal generator 6 can be appropriately controlled based on the angular information. That is, the controller 8 can control the drive operation of the optical scanner 10 in such a way that a light reflection portion 114 of the optical scanner 10, which will be described later, swings around X and Y axes at predetermined frequencies and amplitudes. Further, the controller 8 can cause the image display apparatus 9 to display an image by controlling the optical signal generator 5 in synchronization with the information on the angle of the optical scanner 10.

The information terminal 2 described above can not only display an image in the display section 3 but also cause the image display apparatus 9 including the optical scanner 10 to display the image. The information terminal 2 can therefore cause the image display apparatus 9 to display an image even when the image display apparatus 9 has no light source for image display.

Further, since the information terminal 2 can output an optical signal with which the optical scanner 10 scans the screen and drive signals for driving the optical scanner 10, the image display apparatus 9 used in the system does not need a light source, a drive circuit for the light source, or a power source for driving the optical scanner 10.

Image Display Apparatus

The image display apparatus 9 (projector) includes the optical scanner 10, a lens 91, and a fixed mirror 92, as shown in FIG. 4.

The image display apparatus 9 displays an image on the screen S by driving the optical scanner 10 based on the drive signals from the information terminal 2 described above to scan the screen S with the optical signal from the information terminal 2.

The image display apparatus 9 therefore does not need a light source, a drive circuit for the light source, or a power source for driving the optical scanner 10.

In the present embodiment, the optical signal from the information terminal 2 is incident on the optical scanner 10 via the lens 91. Depending on the configuration of the image display apparatus 9, the lens 91 may be omitted and the optical signal having exited out of the optical fiber 42 may be directly incident on the optical scanner 10.

Further, in the present embodiment, the optical signal having undergone the scanning operation performed by the optical scanner 10 is reflected off the fixed mirror 92 and then incident on the screen S. Depending on the configuration of the image display apparatus 9, the fixed mirror 92 may be omitted and the optical signal having undergone the scanning operation performed by the optical scanner 10 may be directly incident on the screen S.

The optical scanner 10 will be described below in detail.

Optical Scanner

The optical scanner 10 includes a movable portion 11, a pair of shafts 12a and 12b (first shafts), a frame 13, two pairs of shafts 14a, 14b, 14c and 14d (second shafts), a support 15, a permanent magnet 16, a coil 17, a magnetic core 18, and a signal superimposing portion 19, as shown in FIGS. 5 and 6.

The movable portion 11 and the pair of shaft 12a and 12b form a first oscillation system that swings (makes reciprocating motion) around a Y axis (first axis) actually formed of the shafts 12a and 12b. Further, the movable portion 11, the pair of shafts 12a and 12b, the frame 13, the two pairs of shafts 14a, 14b, 14c, and 14d, and the permanent magnet 16 form a second oscillation system that swings (makes reciprocating motion) around an X axis (second axis).

The permanent magnet 16, the coil 17, and the signal superimposing portion 19 form a drive unit that drives the first and second oscillation systems described above (that is, causes the movable portion 11 to swing around the X and Y axes).

The components of the optical scanner 10 will be sequentially described below in detail.

The movable portion 11 includes a base 111, a spacer 112, and a light reflection plate 113 fixed to the base 111 via the spacer 112.

A light reflection portion 114, which reflects light, is provided on the upper surface (one surface) of the light reflection plate 113.

The light reflection plate 113 is set apart from the shafts 12a and 12b in the thickness direction of the light reflection plate 113 but overlaps with the shafts 12a and 12b when viewed in the thickness direction (hereinafter also referred to as "plan view").

The configuration described above allows the area of the plate surface of the light reflection plate 113 to be increased while the distance between the shaft 12a and the shaft 12b to be shortened. Further, since the distance between the shaft 12a and the shaft 12b can be shortened, the size of the frame 13 can be reduced. Moreover, since the size of the frame 13 can be reduced, the distance between the shafts 14a, 14b and the shafts 14c, 14d can be shortened.

As a result, the size of the optical scanner 10 can be reduced with the area of the plate surface of the light reflection plate 113 increased.

The light reflection plate 113 is further so formed that it covers the entire shafts 12a and 12b in the plan view. In other words, the shafts 12a and 12b are located inside the outer circumference of the light reflection plate 113 in the plan view. The area of the plate surface of the light reflection plate 113 is thus increased, resulting in an increase in the area of the light reflection portion 114. The configuration further prevents unwanted light from being reflected off the shafts 12a and 12b to form stray light.

The light reflection plate 113 is further so formed that it covers the entire frame 13 in the plan view. In other words, the frame 13 is located inside the outer circumference of the light reflection plate 113 in the plan view. The area of the plate surface of the light reflection plate 113 is thus increased, resulting in an increase in the area of the light reflection portion 114. The configuration further prevents the unwanted light from being reflected off the frame 13 to form stray light.

Further, the light reflection plate 113 is so formed that it covers the entire shafts 14a, 14b, 14c, and 14d in the plan view. In other words, the shafts 14a, 14b, 14c, and 14d are located inside the outer circumference of the light reflection plate 113 in the plan view. The area of the plate surface of the light reflection plate 113 is thus increased, resulting in an increase in the area of the light reflection portion 114. The configuration further prevents the unwanted light from being reflected off the shafts 14a, 14b, 14c, and 14d to form stray light.

In the present embodiment, the light reflection plate 113 has a circular shape in the plan view. The light reflection plate 113 does not necessarily have a circular shape and may have an elliptical shape or a rectangular or any other polygonal shape in the plan view.

The thus shaped light reflection plate 113 has a hard layer 115 provided on the lower surface thereof (the other surface).

The hard layer 115 is made of a material harder than the material of which the body of the light reflection plate 113 is made, whereby the rigidity of the light reflection plate 113 can be increased. The thus increased rigidity prevents the light reflection plate 113 from being bent or suppresses the amount of bending when the light reflection plate 113 swings. The increased rigidity also allows the thickness of the light reflection plate 113 to be reduced, whereby the moment of inertia of the light reflection plate 113 around the X and Y axes can be reduced when the light reflection plate 113 swings therearound.

The material of which the hard layer 115 is made is not limited to a specific one and can be any material harder than the material of which the body of the light reflection plate 113 is made, for example, diamond, a carbon nitride film, quartz, sapphire, lithium tantalate, or potassium niobate. It is, in particular, preferable to use diamond.

The (average) thickness of the hard layer 115 is not limited to a specific value and preferably ranges from about 1 to 10 μm, more preferably from about 1 to 5 μm.

Further, the hard layer 115 may be formed of a single layer or a laminate including a plurality of layers. The hard layer 115 is provided as necessary and can be omitted.

The hard layer 115 can be formed, for example, by using plasma CVD, thermal CVD, laser CVD, or any other chemical vapor deposition (CVD) process; vacuum deposition, sputtering, ion plating, or any other dry plating process; electrolytic plating, immersion plating, electroless plating, or any other wet plating process; thermal spraying; or bonding of sheet-shaped members.

The lower surface of the light reflection plate 113 is fixed to the base 111 via the spacer 112. The light reflection plate 113 can therefore swing around the Y axis without the lower surface of the light reflection plate 113 coming into contact with the shafts 12a, 12b, the frame 13, or the shafts 14a, 14b, 14c, and 14d.

Further, the base 111 is located inside the outer circumference of the light reflection plate 113 in the plan view. Moreover, the area of the base 111 in the plan view is preferably minimized to the extent that the base 111 can support the light reflection plate 113 via the spacer 112. In this case, the distance between the shaft 12a and the shaft 12b can be reduced with the area of the plate surface of the light reflection plate 113 increased.

The frame 13, which has a frame-like shape, is so disposed that it surrounds the base 111 of the movable portion 11 described above. In other words, the base 111 of the movable portion 11 is disposed inside the frame 13, which has a frame-like shape.

The frame 13 is supported by the support 15 via the shafts 14a, 14b, 14c, and 14d. The base 111 of the movable portion 11 is supported by the frame 13 via the shafts 12a and 12b.

The length of the frame 13 in the direction along the Y axis is longer than the length thereof in the direction along the X axis. That is, a>b is satisfied, where "a" represents the length of the frame 13 in the direction along the Y axis, and "b" represents the length of the frame 13 in the direction along the X axis. The length of the optical scanner 10 in the direction along the X axis can therefore be reduced with the length necessary for the shafts 12a and 12b ensured.

Further, the frame 13 has a shape that follows the outer shape of a structure formed of the base 111 of the movable portion 11 and the pair of shafts 12a and 12b in the plan view. The thus shaped frame 13 can be compact while allowing the first oscillation system formed of the movable portion 11 and the pair of shafts 12a and 12b to oscillate, that is, the movable portion 11 to swing around the Y axis.

The shape of the frame 13 is not limited to the illustrated shape and can be any frame-like shape.

Each of the shafts 12a and 12b and the shafts 14a, 14b, 14c, and 14d is elastically deformable.

The shafts 12a and 12b connect the movable portion 11 to the frame 13 in such a way that the movable portion 11 is pivotable (swingable) around the Y axis (first axis). Further, the shafts 14a, 14b, 14c, and 14d connect the frame 13 to the support 15 in such a way that the frame 13 is pivotable (swingable) around the X axis (second axis), which is perpendicular to the Y axis.

The shafts 12a and 12b are disposed on opposite sides of the base 111 of the movable portion 11. Further, each of the shafts 12a and 12b has an elongated shape extending in the direction along the Y axis. Each of the shafts 12a and 12b has one end connected to the base 111 and the other end connected to the frame 13. Each of the shafts 12a and 12b is further so disposed that the central axis thereof coincides with the Y axis.

The thus configured shafts 12a and 12b are torsionally deformed when the movable portion 11 swings around the Y axis.

The shafts 14a and 14b and the shafts 14c and 14d are disposed on opposite sides of the frame 13. Each of the shafts 14a, 14b, 14c, and 14d has an elongated shape extending in the direction along the X axis. Further, each of the shafts 14a, 14b, 14c, and 14d has one end connected to the frame 13 and the other end connected to the support 15. Further, the shafts 14a and 14b are disposed on opposite sides of the X axis. Similarly, the shafts 14c and 14d are disposed on opposite sides of the X axis.

The shafts 14a, 14b, 14c, and 14d are so configured that the shafts 14a and 14b as a whole and the shafts 14c and 14d as a whole are torsionally deformed when the frame 13 swings around the X axis.

As described above, the movable portion 11 swingable around the Y axis and the frame 13 swingable around the X axis allow the movable portion 11 to swing (pivot) around the two axes perpendicular to each other, the X and Y axes.

At least one of the shafts 12a and 12b and at least one of the shafts 14a, 14b, 14c, and 14d are each provided with an angle detection sensor, such as a strain sensor. The angle detection sensor can detect information on the angle of the optical scanner 10, more specifically, angles of swing motion of the light reflection portion 114 around the X and Y axes. A detection result is transmitted to the angular information input portion 74 in the connection section 7 through the signal line (not shown) in the cable 40, as described above.

The shapes of the shafts 12a and 12b and the shafts 14a, 14b, 14c, and 14d are not limited to those described above, and each of them may, for example, have a bent or curved portion or a branch in at least one position along the shaft.

The base 111, the shafts 12a and 12b, the frame 13, the shafts 14a, 14b, 14c, and 14d, and the support 15 described above are formed integrally with each other.

In the present embodiment, the base 111, the shafts 12a and 12b, the frame 13, the shafts 14a, 14b, 14c, and 14d, and the support 15 are formed by etching an SOI substrate formed of a first Si layer (device layer), an $SiO_2$ layer (box layer), and a second Si layer (handle layer) stacked in this order. The formation of the components described above provides the first and second oscillation systems with excellent oscillation characteristics. Further, forming the base 111, the shafts 12a and 12b, the frame 13, the shafts 14a, 14b, 14c, and 14d, and the support 15 by using the SOI substrate, which allows etching-based micro-processing, not only provides excellent precision in their dimensions but also reduces the size of the optical scanner 10.

The first Si layer of the SOI substrate forms the base 111, the shafts 12a and 12b, and the shafts 14a, 14b, 14c, and 14d. The shafts 12a and 12b and the shafts 14a, 14b, 14c, and 14d therefore have excellent elasticity. Further, the base 111 will not come into contact with the frame 13 when the base 111 pivots around the Y axis.

Each of the frame 13 and the support 15 is formed of the SOI substrate or the stacked member formed of the first Si layer, the $SiO_2$ layer, and the second Si layer, whereby the frame 13 and the support 15 have excellent rigidity. Further, the $SiO_2$ layer and the second Si layer of the frame 13 not only function as a rib that increases the rigidity of the frame 13 but also have a function of preventing the movable portion 11 from coming into contact with the permanent magnet 16.

The upper surface of the support 15 preferably undergoes antireflection processing, which prevents unwanted light incident on the support 15 from forming stray light.

The antireflection processing is not limited to a specific process and can, for example, be formation of an antireflection film (dielectric multilayer film), surface roughing, and surface blackening.

The materials of which the base 111, the shafts 12a and 12b, and the shafts 14a, 14b, 14c, and 14d are made and the method for forming these components described above are presented by way of example and are not necessarily used in the invention.

Further, in the present embodiment, the spacer 112 and the light reflection plate 113 are also formed by etching the SOI substrate. The spacer 112 is formed of a stacked member of the $SiO_2$ layer and the second Si layer of the SOI substrate. The light reflection plate 113 is formed of the first Si layer of the SOI substrate.

The spacer 112 and the light reflection plate 113 bonded to each other can thus be manufactured in a simple, highly precise manner by forming the spacer 112 and the light reflection plate 113 based on the SOI substrate as described above.

The spacer 112 is bonded to the base 111 with an adhesive, a wax material, or any other suitable bonding material (not shown).

The permanent magnet 16 is bonded to the lower surface of the frame 13 described above (surface facing away from light reflection plate 113).

A method for bonding the permanent magnet 16 to the frame 13 is not limited to a specific one and can, for example, be a bonding method using an adhesive.

The permanent magnet 16 is magnetized in a direction inclined to the X and Y axes in the plan view.

In the present embodiment, the permanent magnet 16 has an elongated shape (rod-like shape) extending in a direction inclined to the X and Y axes. The permanent magnet 16 is magnetized in the elongated direction. That is, the permanent magnet 16 is so magnetized that one end thereof forms an S pole and the other end thereof forms an N pole.

Further, the permanent magnet 16 is so disposed that it is symmetrical with respect to the intersection of the X axis and the Y axis in the plan view.

In the present embodiment, the description is made with reference to the case where one permanent magnet is disposed on the frame 13, but the number of permanent magnets is not limited one. For example, two permanent magnets may be disposed on the frame 13. In this case, for example, two elongated permanent magnets may be so disposed on the frame 13 that they face and are parallel to each other with the base 111 therebetween in the plan view.

The inclination angle θ of the direction in which the permanent magnet 16 is magnetized (direction in which permanent magnet 16 extends) with respect to the X axis is not limited to a specific value and is preferably greater than or equal to 30° but smaller than or equal to 60°, more preferably greater than or equal to 45° but smaller than or equal to 60°, still more preferably 45°. The thus disposed permanent magnet 16 allows the movable portion 11 to pivot around the X axis in a smooth, reliable manner.

In contrast, when the inclination angle θ is smaller than the lower limit described above, the movable portion 11 may not pivot around the X axis by a sufficient amount in some cases depending on conditions, such as the magnitude of a voltage applied to the coil 17. On the other hand, when the inclination angle θ is greater than the upper limit described above, the movable portion 11 may not pivot around the Y axis by a sufficient amount in some cases depending on the conditions.

The permanent magnet 16 can preferably be, for example, a neodymium magnet, a ferrite magnet, a samarium cobalt magnet, an Alnico magnet, or a bonded magnet. The permanent magnet 16 is a magnetized hard magnetic material and formed, for example, by placing a hard magnetic material not yet having been magnetized on the frame 13 and magnetizing the entire structure. The reason for this is that an attempt to place the permanent magnet 16, which has been magnetized, on the frame 13 may not result in successful placement of the permanent magnet 16 in a desired position in some cases because magnetic fields produced by objects outside the scanner and other parts in the scanner affect the placement of the permanent magnet 16.

The coil 17 is disposed immediately below the permanent magnet 16. That is, the coil 17 is so disposed that it faces the lower surface of the frame 13. A magnetic field produced by the coil 17 can therefore act on the permanent magnet 16 in an efficient manner. As a result, the electricity consumption and the size of the optical scanner 10 can be reduced.

In the present embodiment, the coil 17 is wound around the magnetic core 18. The magnetic field produced by the coil 17 can thus act on the permanent magnet 16 in an efficient manner. The magnetic core 18 may be omitted.

The thus configured coil 17 is electrically connected to the signal superimposing portion 19.

When the signal superimposing portion 19 applies a voltage to the coil 17, the coil 17 produces a magnetic field formed of a magnetic flux perpendicular to the X and Y axes.

The signal superimposing portion 19 is disposed in the optical scanner 10 or the image display apparatus 9, includes an adder (not show) that superimposes the first drive signal V1 transmitted through the signal line 43 and the second drive signal V2 transmitted through the signal line 44 on each other, and applies the superimposed voltage to the coil 17.

The first drive signal V1 and the second drive signal V2 will now be described in detail.

The drive circuit 61 generates the first drive signal V1 (voltage for horizontal scan), which periodically changes at the cycle T1 as shown in FIG. 3A, as described above. That is, the drive circuit 61 generates the first drive signal V1 having a first frequency (1/T1).

The first drive signal V1 has a sinusoidal waveform. The optical scanner 10 can therefore effectively perform primary optical scanning. The waveform of the first drive signal V1 is not limited to a sinusoidal waveform.

The first frequency (1/T1) is not limited to a specific value and may be any value suitable for horizontal scan and preferably ranges from 10 to 40 kHz.

In the present embodiment, the first frequency is set to be equal to a torsional resonant frequency (f1) of the first oscillation system (torsional oscillation system) formed of the movable portion 11 and the pair of shafts 12*a* and 12*b*. That is, the first oscillation system is so designed (manufactured) that the torsional resonant frequency f1 thereof has a value suitable for horizontal scan. The angle of pivotal motion of the movable portion 11 around the Y axis can therefore be increased.

On the other hand, the drive circuit 62 generates the second drive signal V2 (voltage for vertical scan), which periodically changes at a cycle T2 different from the cycle T1 as described above, as shown in FIG. 3B. That is, the drive circuit 62 generates the second drive signal V2 having a second frequency (1/T2).

The second drive signal V2 has a saw-toothed waveform. The optical scanner 10 can therefore effectively perform vertical (secondary) optical scanning. The waveform of the second drive signal V2 is not limited to a saw-toothed waveform.

The second frequency (1/T2) is not limited to a specific value and may be any value different from the first frequency (1/T1) and suitable for vertical scan and preferably ranges from 30 to 80 Hz (about 60 Hz). Setting the frequency of the second drive signal V2 at about 60 Hz and the frequency of the first drive signal V1 at a value ranging from 10 to 40 kHz as described above allows the movable portion 11 to pivot around the two axes perpendicular to each other (X and Y axes) at the frequencies suitable for image drawing in a display. The combination of the frequency of the first drive signal V1 and the frequency of the second drive signal V2 is not limited to a specific one and can be any combination that allows the movable portion 11 to pivot around the X and Y axes.

In the present embodiment, the frequency of the second drive signal V2 is adjusted to a value different from a torsional resonant frequency (resonant frequency) of the second oscillation system (torsional oscillation system) formed of the movable portion 11, the pair of shafts 12*a* and 12*b*, the frame 13, the two pairs of shafts 14*a*, 14*b*, 14*c*, and 14*d*, and the permanent magnet 16.

The thus set frequency of the second drive signal V2 (second frequency) is preferably lower than the frequency of the first drive signal V1 (first frequency). That is, the cycle T2 is preferably longer than the cycle T1. In this case, the movable portion 11 is allowed to pivot not only around the Y axis at the first frequency but also around the X axis at the second frequency in a more reliable, smoother manner.

Now, let f1 [Hz] be the torsional resonant frequency of the first oscillation system and f2 [Hz] be the torsional resonant frequency of the second oscillation system, and f1 and f2 preferably satisfy f2<f1, more preferably f1≥10f2. Satisfying the relationship described above allows the movable portion 11 to pivot not only around the Y axis at the frequency of the first drive signal V1 but also around the X axis at the frequency of the second drive signal V2 in a smoother manner. On the other hand, when f1≤f2, the first oscillation system can oscillate at the second frequency.

A description will next be made of a method for driving the optical scanner 10. In the present embodiment, the frequency of the first drive signal V1 is set to be equal to the torsional resonant frequency of the first oscillation system, and the frequency of the second drive signal V2 is set to be not only different from the torsional resonant frequency of the second oscillation system but also smaller than the frequency of the first drive signal V1 as described above (for example, the frequency of the first drive signal V1 is set at 15 kHz, and the frequency of the second drive signal V2 is set at 60 Hz).

For example, the signal superimposing portion 19 superimposes the first drive signal V1 shown in FIG. 3A and the second drive signal V2 shown in FIG. 3B on each other and applies the superimposed voltage to the coil 17.

The first drive signal V1 produces the following alternately switching magnetic fields: a magnetic field that causes the one end (N pole) of the permanent magnet 16 to be attracted to the coil 17 and the other end (S pole) of the permanent magnet 16 to be repulsed from the coil 17 (the magnetic field is referred to as "magnetic field A1"); and a magnetic field that causes the one end (N pole) of the permanent magnet 16 to be repulsed from the coil 17 and the other end (S pole) of the permanent magnet 16 to be attracted to the coil 17 (the magnetic field is referred to as "magnetic field A2").

The permanent magnet 16 is so disposed that the ends (magnetic poles) thereof are positioned in two areas on opposite sides of the Y axis, as described above. That is, the N pole of the permanent magnet 16 is located on one side of the Y axis, and the S pole of the permanent magnet 16 is located on the other side of the Y axis in the plan view of FIG. 5. When the magnetic field A1 and the magnetic field A2 are alternately switched from each other as described above, oscillation having a torsional oscillation component around the Y axis is excited in the frame 13, and the oscillation causes the shafts 12a and 12b to be torsionally deformed and hence the movable portion 11 to pivot around the Y axis at the frequency of the first drive signal V1.

The frequency of the first drive signal V1 is equal to the torsional resonant frequency of the first oscillation system. The first drive signal V1 therefore allows the movable portion 11 to pivot around the Y axis in an efficient manner. That is, even when the oscillation excited in the frame 13 and having a torsional oscillation component around the Y axis described above has a small amplitude, the angle of pivotal motion of the movable portion 11 around the Y axis produced by the oscillation can be increased.

On the other hand, the second drive signal V2 produces the following alternately switching magnetic fields: a magnetic field that causes the one end (N pole) of the permanent magnet 16 to be attracted to the coil 17 and the other end (S pole) of the permanent magnet 16 to be repulsed from the coil 17 (the magnetic field is referred to as "magnetic field B1"); and a magnetic field that causes the one end (N pole) of the permanent magnet 16 to be repulsed from the coil 17 and the other end (S pole) of the permanent magnet 16 to be attracted to the coil 17 (the magnetic field is referred to as "magnetic field B2").

The permanent magnet 16 is so disposed that the ends (magnetic poles) thereof are positioned in two areas on opposite sides of the X axis, as described above. That is, the N pole of the permanent magnet 16 is located on one side of the X axis, and the S pole of the permanent magnet 16 is located on the other side of the X axis in the plan view of FIG. 5. When the magnetic field B1 and the magnetic field B2 are alternately switched from each other as described above, the shafts 14a and 14b and the shafts 14c and 14d are torsionally deformed and the frame 13 along with the movable portion 11 pivots around the X axis at the frequency of the second drive signal V2.

The frequency of the second drive signal V2 is set to be greatly lower than the frequency of the first drive signal V1. Further, the torsional resonant frequency of the second oscillation system is designed to be lower than the torsional resonant frequency of the first oscillation system. No pivotal motion of the movable portion 11 around the Y axis will therefore occur at the frequency of the second drive signal V2.

Since the video image display system 1 described above includes the information terminal 2 capable of outputting an optical signal and drive signals used by the optical scanner 10, the size and weight of the image display apparatus 9 can be reduced and the image display apparatus 9 requires no built-in power source.

Second Embodiment

A second embodiment of the invention will next be described.

Figure 7:
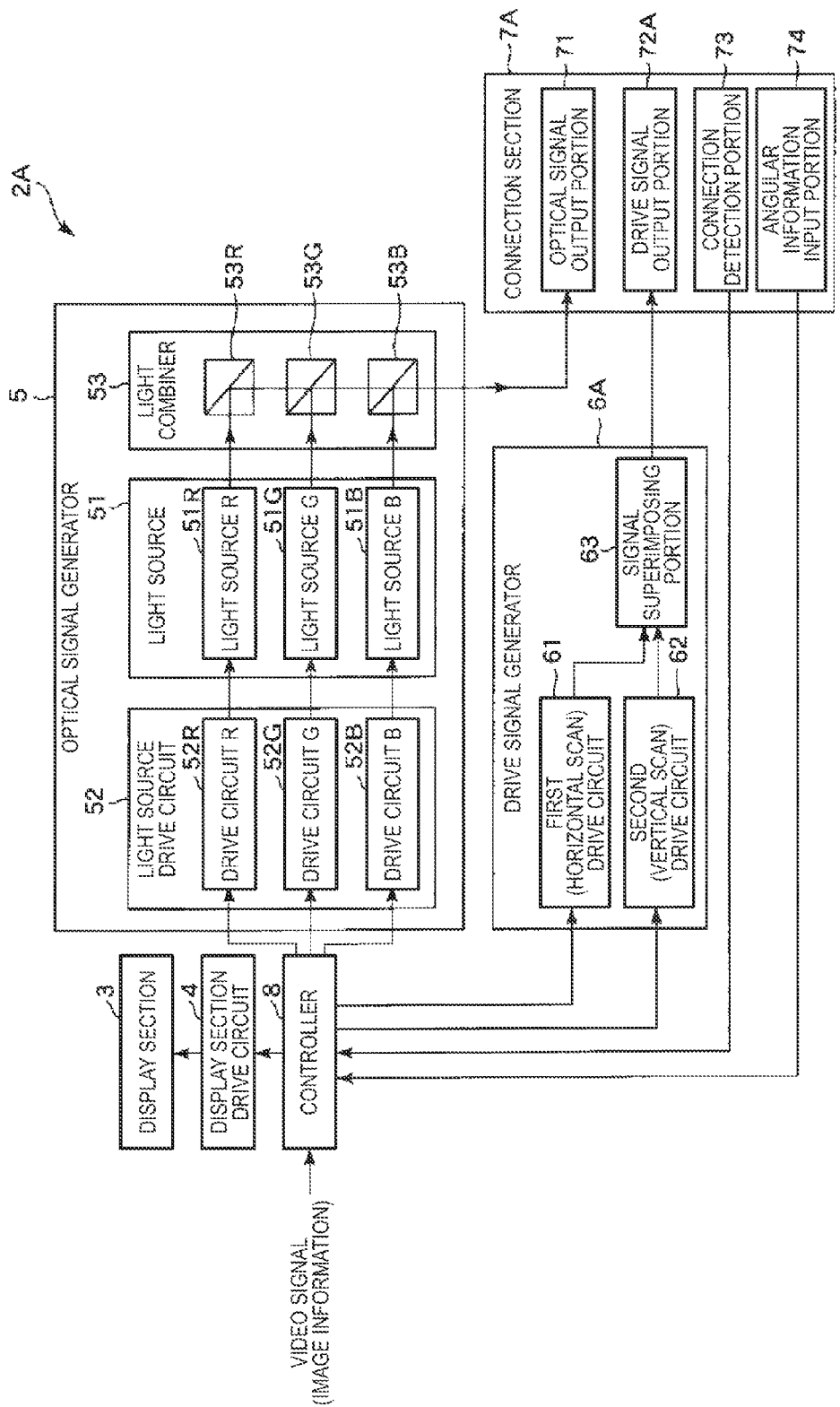
FIG. 7 is a block diagram showing a schematic configuration of an information terminal (mobile information terminal) in a video image display system according to a second embodiment of the invention.

FIG. 7 is a block diagram showing a schematic configuration of an information terminal (mobile information terminal) in a video image display system according to the second embodiment of the invention.

The following description of the second embodiment will be made primarily on differences from the first embodiment described above, and no description of the same items as those in the first embodiment will be made. In FIG. 7, the same components as those in the embodiment described above have the same reference characters.

The video image display system according to the present embodiment is the same as the video image display system according to the first embodiment described above except that a signal superimposing portion is provided in the drive signal generator.

An information terminal 2A in the video image display system according to the second embodiment includes a drive signal generator 6A and a connection section 7A, as shown in FIG. 7.

The drive signal generator 6A includes the drive circuits 61 and 62 and a signal superimposing portion 63.

The signal superimposing portion 63 superimposes the first drive signal and the second drive signal on each other.

The signal superimposing portion 63 can be configured in the same manner as the signal superimposing portion 19 in the first embodiment described above.

The thus configured drive signal generator 6A transmits a drive signal produced by superimposing the first drive signal and the second drive signal on each other to the connection section 7A.

The connection section 7A includes a drive signal output portion 72A, which outputs the drive signal out of the information terminal 2A.

The thus configured information terminal 2A eliminates a need to provide each of the first and second drive signals with a signal line that transmits the drive signal to the image display apparatus 9, whereby the number of signal lines can be reduced.

In the present embodiment, although not shown, no signal superimposing portion in the optical scanner 10 in the image display apparatus 9 is provided.

The video image display system according to the second embodiment described above also allows the size and weight of the image display apparatus 9 to be reduced and eliminates a need to provide the image display apparatus 9 with a built-in power source for driving the optical scanner 10.

Third Embodiment

A third embodiment of the invention will next be described.

Figure 8:
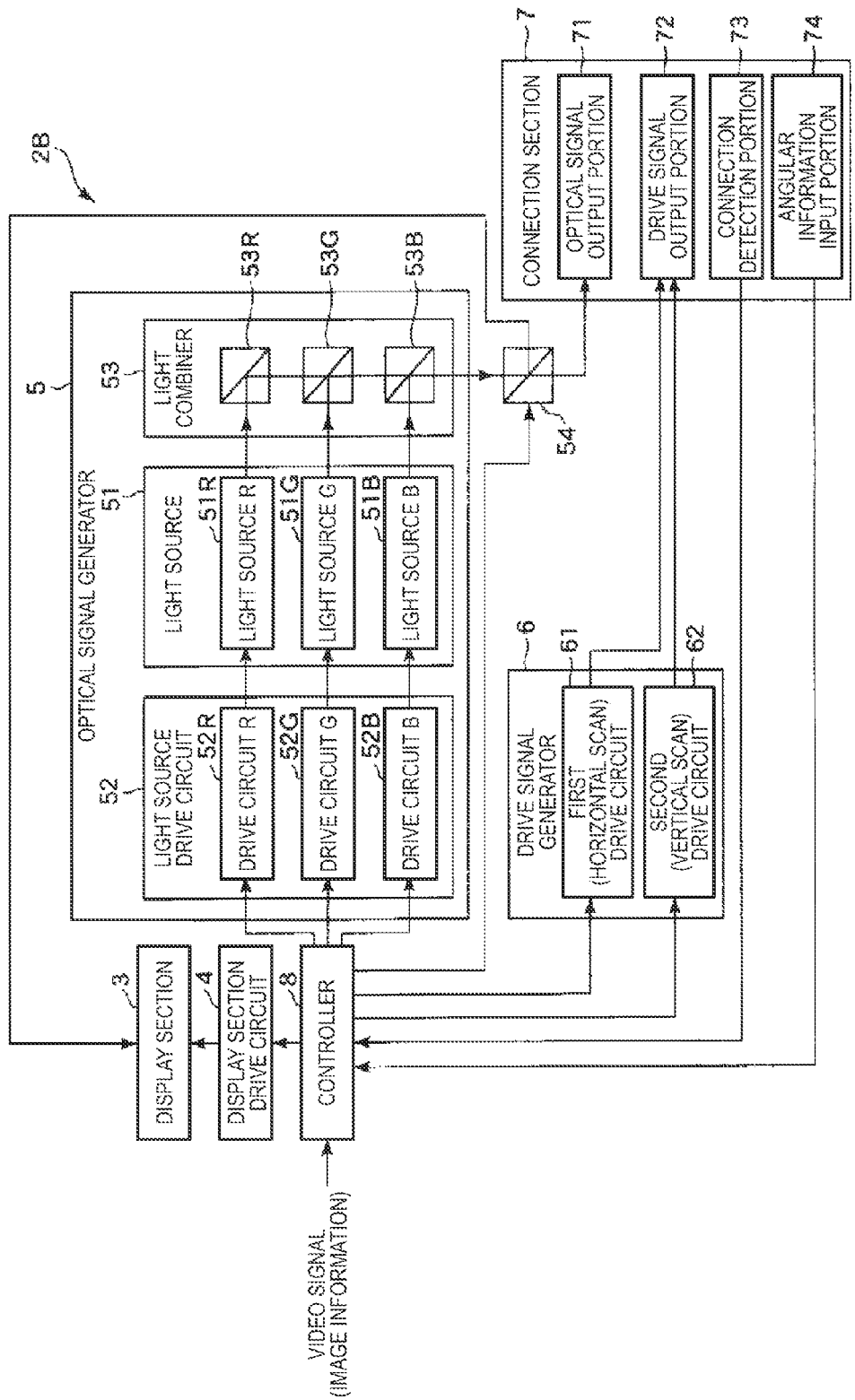
FIG. 8 is a block diagram showing a schematic configuration of an information terminal (mobile information terminal) in a video image display system according to a third embodiment of the invention.

FIG. 8 is a block diagram showing a schematic configuration of an information terminal (mobile information terminal) in a video image display system according to the third embodiment of the invention.

The following description of the third embodiment will be made primarily on differences from the first embodiment described above, and no description of the same items as those in the first embodiment will be made.

The video image display system according to the present embodiment is the same as the video image display system according to the first embodiment described above except that the light from the light source in the optical signal generator is used as the illumination light for the display section.

An information terminal 2B in the video image display system according to the third embodiment includes an optical path switcher 54, as shown in FIG. 8.

In the present embodiment, the display section 3 includes a spatial light modulator, and the spatial light modulator, when it is irradiated with light, displays an image. Specifically, in the display section 3, for example, a liquid crystal panel as the spatial light modulator is illuminated by using the light guide plate.

The display section 3 uses the light from the light source 51 in the optical signal generator 5 as the illumination light to display an image in the first state. It can be said that the light source 51 is a component in the optical signal generator 5 or a component in the display section 3.

Since no light source that emits illumination light for the display section 3 therefore needs to be provided separately from the light source 51, which forms an optical signal for the optical scanner, the size and weight of the information terminal 2B can be reduced.

Specifically, the optical path switcher 54 is configured to be capable of switching the state of the information terminal 2B between a state in which the path of the light (optical path) from the light source 51 is guided to the light guide plate (not shown) in the display section 3 and a state in which the optical path is guided to the optical signal output portion 71.

In the present embodiment, the optical path switcher 54 is disposed in a position somewhere along the optical path between the optical signal generator 5 and the optical signal output portion 71 in the connection section 7. Further, the optical path switcher 54 is optically connected to the light guide plate in the display section 3, for example, via an optical fiber or an optical waveguide.

The optical path switcher 54 is not necessarily disposed in the position described above and may be disposed in any position where the light from the light source 51 used as the illumination light can be switched to the light used as the optical signal and vice versa, for example, in a position between the light source 51 and the light combiner 53. In this case, the light fluxes from the light sources 51R, 51G, and 51B may be combined with each other before they are guided to the display section 3.

The optical path switcher 54 is formed, for example, of an optical switch capable of changing the direction of light incident thereon.

The thus configured optical path switcher 54 is electrically connected to the controller 8.

The optical path switcher 54 therefore performs the optical path switching under the control of the controller 8.

Specifically, the controller 8 in the present embodiment controls the switching operation performed by the optical path switcher 54 in such a way that the light emitted from the light source 51 is guided to the display section 3 in the first state (the light emitted from the light source 51 is not guided to the optical signal output portion 71), whereas the light emitted from the light source 51 is guided to the optical signal output portion 71 in the second state (the light emitted from the light source 51 is not guided to the display section 3).

The controller 8 drives the optical signal generator 5 in such a way that the optical signal generator 5 generates the illumination light in the first state. Specifically, the light sources 51R, 51G, and 51B each continuously emit light fluxes so that the combined light from the light combiner 53 is white light. The light from the light source 51 (combined white light from light combiner 53) can therefore be used as the illumination light for the display section 3. That is, it can be said in the first state that the optical signal generator 5 generates no optical signal with which the optical scanner 10 scans the screen.

In the second state, the controller 8 drives the optical signal generator 5 in such away that the optical signal generator 5 generates an optical signal (light modulated based on image information) as in the embodiments described above.

The video image display system according to the third embodiment described above also allows the size and weight of the image display apparatus 9 to be reduced and eliminates a need to provide the image display apparatus 9 with a built-in power source for driving the optical scanner 10.

The optical path switcher 54 may perform the optical path switching by mechanically moving or rotating a prism, a mirror, or any other optical element. For example, a member (not shown) that comes into contact with the connector 41 when the connector 41 is connected to the connection section 7 and is pushed out of the connection section 7 can be so provided that the member directly or indirectly applies a force to the optical path switcher 54 to move or rotate the optical path switcher 54 for optical path switching. In this configuration, the optical path switching can be performed in accordance with connection or disconnection of the connector 41 with no electric configuration required.

An application of any of the video image display systems descried above will be described below.

Application of Video Image Display System

Figure 9:
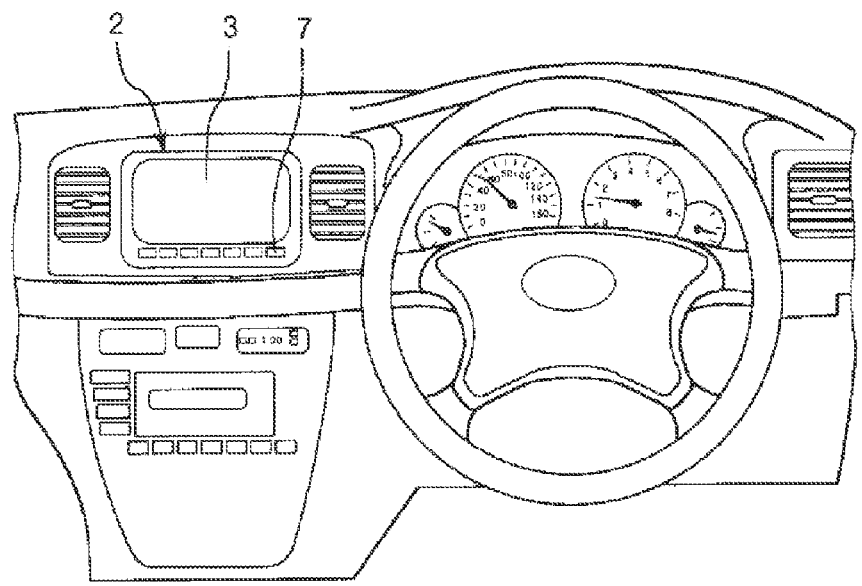
FIG. 9 shows an application of the video image display system according to any of the embodiments of the invention (showing information terminal side).
Figure 10:
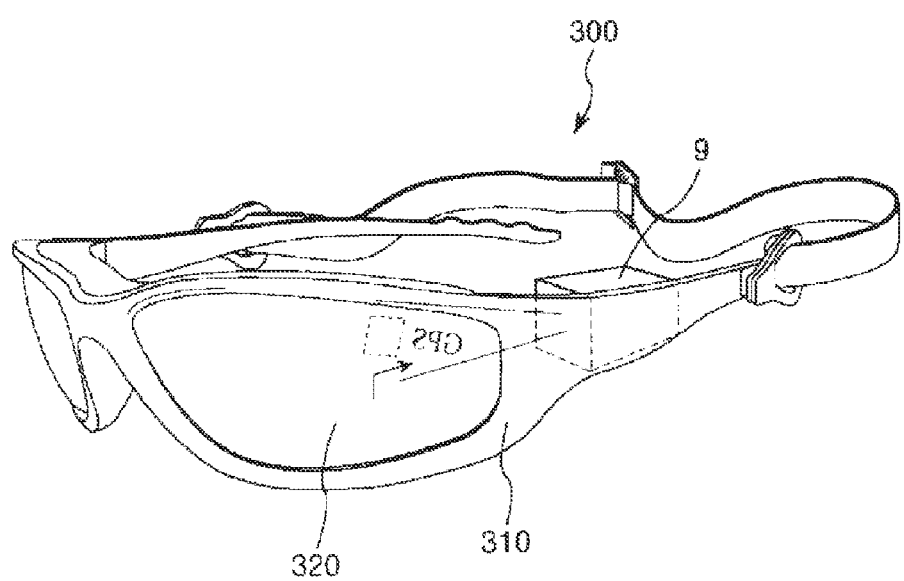
FIG. 10 shows the application of the video image display system according to the embodiment of the invention (showing display apparatus side).

FIG. 9 shows an application of the video image display system according to any of the embodiments of the invention (showing information terminal side), and FIG. 10 shows the application of the video image display system according to the embodiment of the invention (showing display apparatus side).

The information terminal 2 can be used as a car navigation apparatus built in an automobile, as shown in FIG. 9.

The information terminal 2 can display a predetermined image, such as a guide map to a destination, in the display section 3.

Further, the connection section 7 of the information terminal 2 is provided on the same side as the display section 3. A user can thus connect the connector 41 to the connection section 7 as required and visually recognize the predetermined image displayed by the image display apparatus 9.

A head mounted display can be used with the image display apparatus 9.

That is, the image display apparatus 9 can be used in a head mounted display 300, as shown in FIG. 10.

The head mounted display 300 is what is called a spectacle-type head mounted display and includes a frame 310 and the image display apparatus 9 attached to the frame 310. The image display apparatus 9 displays the predetermined image visually recognized with one of the eyes in a display section 320 provided in a portion of the frame 310 that corresponds to the eye (portion corresponding to spectacle lens).

The display section 320 may be transparent or opaque. When the display section 320 is transparent, information from the real world can be superimposed on information from the image display apparatus 9 for use.

The head mounted display 300 may be provided with two image display apparatus 9 so that two display sections display images visually recognized with both eyes.

A user who wears the thus configured head mounted display 300 has a reduced degree of fatigue, and the head mounted display 300 also provides a high degree of freedom in exterior appearance.

Further, the video image display system that is the combination of the head mounted display 300 and the car navigation apparatus described above occupies a smaller space and requires a lower cost than a car navigation apparatus with a head-up display of related art.

The information terminal 2 is not only incorporated in an automobile but can be incorporated in an airplane, a ship, and other moving vehicles.

The information terminals, the mobile information terminals, and the video image display systems according to the embodiments of the invention have been described with reference to the drawings, but the invention is not limited thereto. For example, in the information terminals, the mobile information terminals, and the video image display systems according to the embodiments of the invention, the configuration of each of the components can be replaced with an arbitrary configuration having the same function. Further, any other arbitrary configuration may be added to the embodiments of the invention.

Further, the invention is applicable to a combination of two or more arbitrary configurations (features) of the embodiments.

Moreover, the above embodiments have been described with reference to the case where the image display apparatus includes an optical scanner that two-dimensionally scans an object with light but the image display apparatus is not necessarily configured this way. The image display apparatus may include two optical scanners each of which scans an object with light in one direction, and the two optical scanners may scan the object two-dimensionally. In this case, the first drive signal may be inputted to one of the optical scanners, and the second drive signal may be inputted to the other optical scanner.

Further, the above embodiments have been described with reference to the case where the drive signals generated by the drive signal generator serve as drive electric power for directly driving the optical scanner in the image display apparatus. The drive signals generated by the drive signal generator may be control signals that control the drive operation of the optical scanner. In this case, the image display apparatus may be provided with a power source that generates drive electric power for driving the optical scanner, and the power source may be controlled and driven based on the drive signals from the drive signal generator.

The entire disclosure of Japanese Patent Application No. 2012-180907, filed Aug. 17, 2012 is expressly incorporated by reference herein.

What is claimed is:

1. An information terminal comprising:
   a display section that displays an image;
     a light source that emits light;
     an optical signal generator that uses the light emitted from the light source to generate an optical signal with which an optical scanner scans an object;
     a drive signal generator that generates a drive signal for driving the optical scanner; and
     a switcher that switches the state of the information terminal between a first state in which the display section displays an image, the optical signal generator does not generate the optical signal, and the drive signal generator does not generate the drive signal and a second state in which the optical signal generator generates the optical signal, the drive signal generator generates the drive signal, and the display section displays no image, wherein
   the display section includes a spatial light modulator, and
   the switcher performs optical path switching so that the spatial light modulator is irradiated with the light emitted from the light source in the first state, and the spatial light modulator is not irradiated with the light from the light source in the second state.

2. The information terminal according to claim 1, further comprising:
   an optical signal output portion that outputs the optical signal out of the information terminal;
   a drive signal output portion that outputs the drive signal out of the information terminal; and
   a connection section to and from which a connector provided on a cable including an optical fiber and a signal line is connectable and disconnectable,
   wherein when the connector is connected to the connection section, the optical signal output portion is optically connected to the optical fiber and the drive signal output portion is electrically connected to the signal line.

3. The information terminal according to claim 2, further comprising
   a connection detection portion that detects whether or not the connector is connected to the connection section, and
   wherein the switcher sets the state of the information terminal based on a detection result from the connection detection portion to be the first state when the connector is not connected to the connection section whereas setting the state to be the second state when the connector is connected to the connection section.

4. The information terminal according to claim 1,
   wherein the light source is formed of a plurality of light sources that produce light fluxes having wavelengths different from each other.

5. The information terminal according to claim 4,
   wherein the optical signal generator includes a light combiner that combines the light fluxes from the plurality of light sources with each other.

6. The information terminal according to claim 1,
   wherein the drive signal generator includes a first drive circuit that generates a first drive signal used by the optical scanner to perform scanning in a first direction and a second drive circuit that generates a second drive signal used by the optical scanner to perform scanning in a second direction perpendicular to the first direction.

7. The information terminal according to claim 6,
   wherein the drive signal generator includes a signal superimposing portion that superimposes the first drive signal and the second drive signal on each other.

8. A mobile information terminal comprising:
a display section that displays an image;
a light source that emits light;
an optical signal generator that uses the light emitted from the light source to generate an optical signal with which an optical scanner scans an object;
a drive signal generator that generates a drive signal for driving the optical scanner; and
a switcher that switches the state of the mobile information terminal between a first state in which the display section displays an image, the optical signal generator does not generate the optical signal, and the drive signal generator does not generate the drive signal and a second state in which the optical signal generator generates the optical signal, the drive signal generator generates the drive signal, and the display section displays no image, wherein
the display section includes a spatial light modulator and
the switcher perform optical path switching so that the spatial light modulator is irradiated with the light emitted from the light source in the first state, and the spatial light modulator is not irradiated with the light from the light source in the second state.

9. A video image display system comprising:
the information terminal according to claim 1; and
an image display apparatus including the optical scanner and connected to the information terminal.

10. A video image display system comprising:
the information terminal according to claim 2; and
an image display apparatus including the optical scanner and connected to the information terminal.

11. A video image display system comprising:
the information terminal according to claim 3; and
an image display apparatus including the optical scanner and connected to the information terminal.

12. A video image display system comprising:
the information terminal according to claim 4; and
an image display apparatus including the optical scanner and connected to the information terminal.

13. A video image display system comprising:
the information terminal according to claim 5; and
an image display apparatus including the optical scanner and connected to the information terminal.

14. A video image display system comprising:
the information terminal according to claim 6; and
an image display apparatus including the optical scanner and connected to the information terminal.

15. A video image display system comprising:
the information terminal according to claim 7; and
an image display apparatus including the optical scanner and connected to the information terminal.

16. The video image display system according to claim 9, wherein the optical scanner includes
a movable portion that is provided with a light reflection portion that reflects light and swingable around a first axis,
a frame that is swingable around a second axis that intersects the first axis,
a first shaft that has one end connected to the movable portion and the other end connected to the frame and supports the movable portion in such a way that the movable portion is swingable around the first axis, and
a second shaft that has one end connected to the frame and supports the frame in such a way that the frame is swingable around the second axis.

17. The video image display system according to claim 16, wherein the optical scanner further includes a permanent magnet and a coil,
the permanent magnet and the coil are so disposed that one of the permanent magnet and the coil is disposed on the frame and the other one of the permanent magnet and the coil is disposed in a position facing the frame,
the drive signal generator includes a first drive circuit that generates a first drive signal that causes the movable portion to swing around the first axis and a second drive circuit that generates a second drive signal that causes the movable portion to swing around the second axis perpendicular to the first axis, and
the first drive signal and the second drive signal are superimposed on each other and the superimposed drive signal is applied to the coil.

18. The video image display system according to claim 9, wherein the image display apparatus is a head mounted display.

* * * * *